Patented Aug. 21, 1951

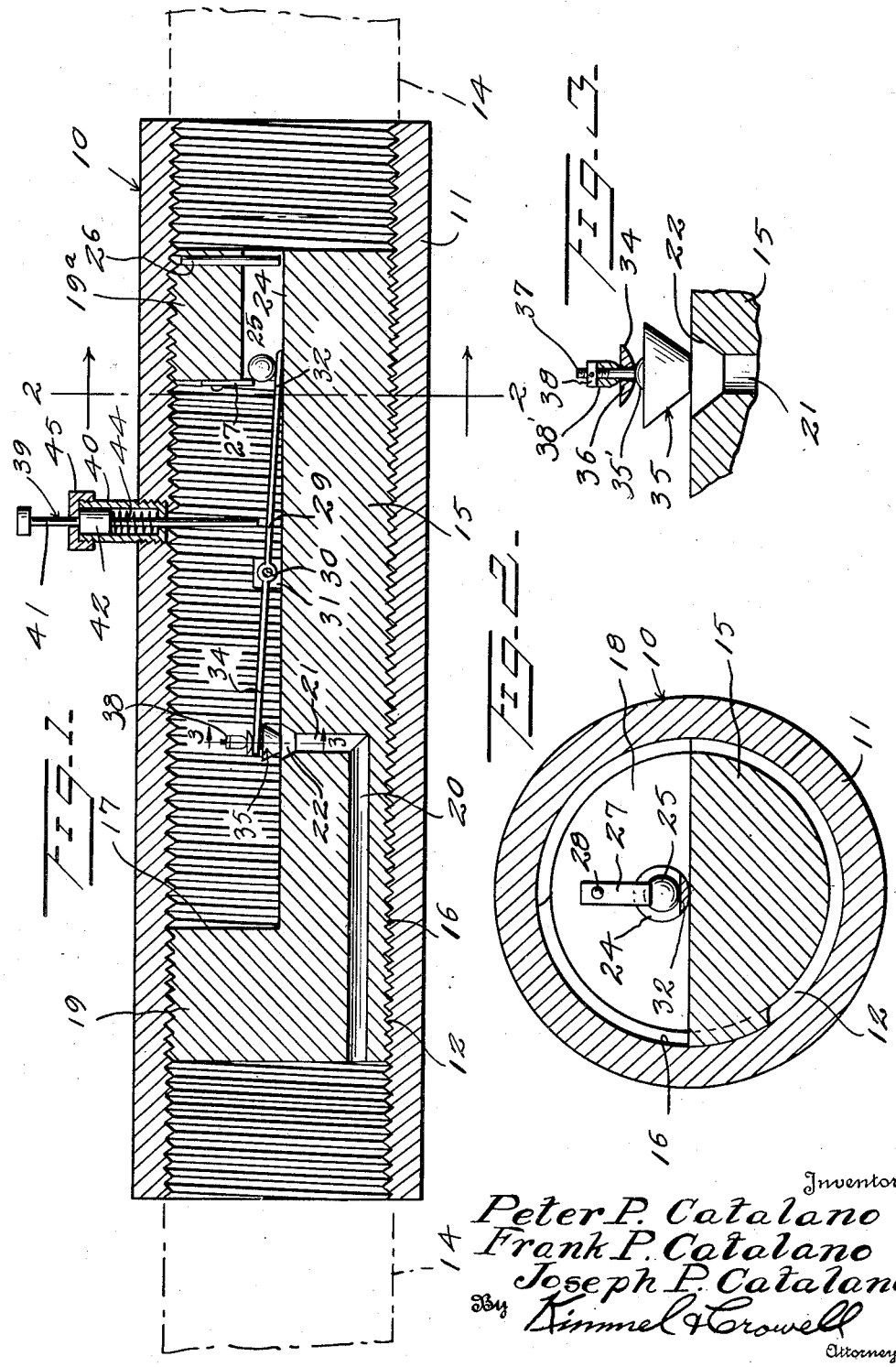

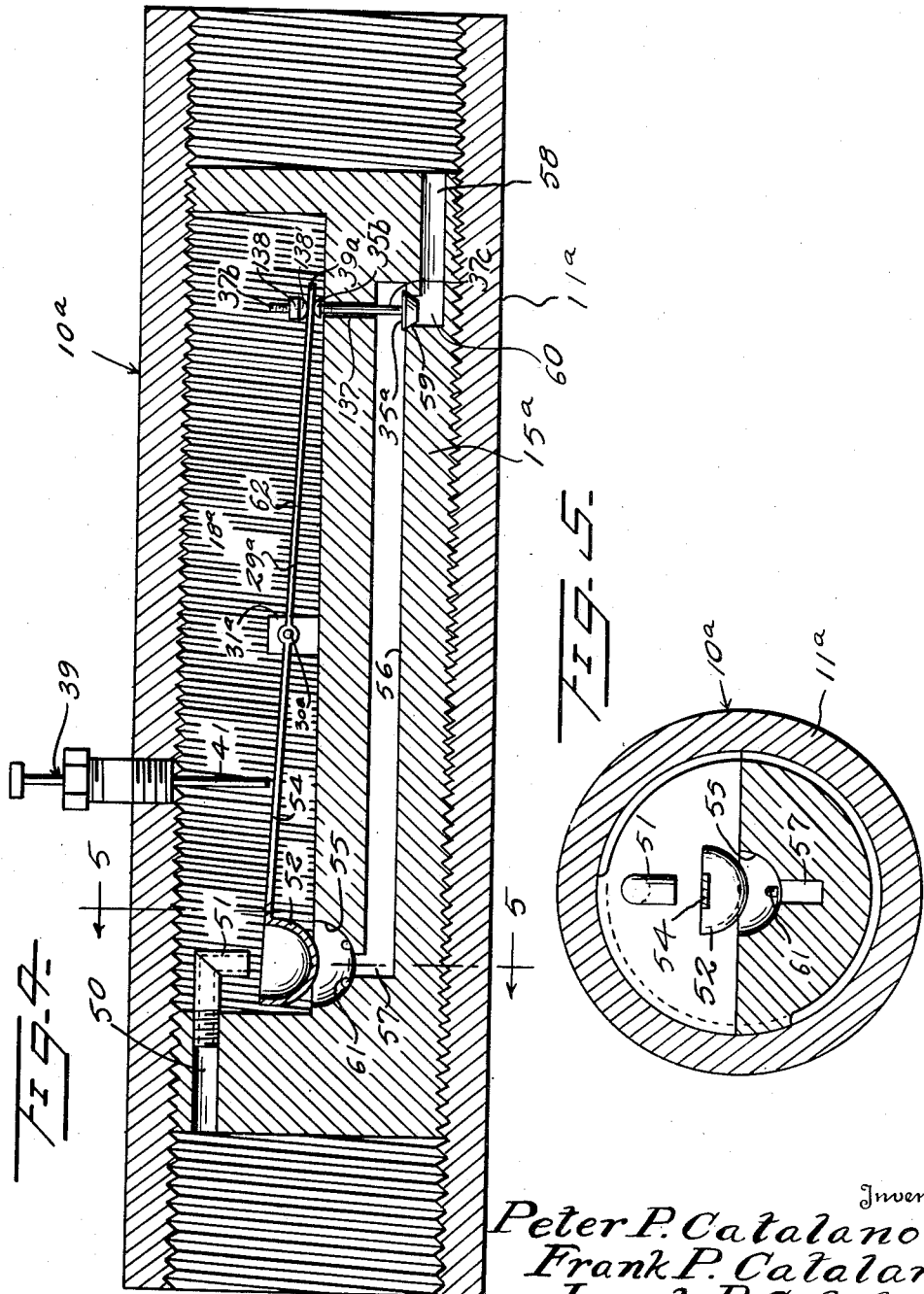

2,565,421

UNITED STATES PATENT OFFICE 2,565,421

SAFETY GAS SHUTOFF

Peter P. Catalano, Joseph P. Catalano, and Frank P. Catalano, North Collins, N. Y., assignors to Panepinto Mfg. Corp., North Collins, N. Y., a corporation of New York Application February 10, 1947, Serial No. 727,690

5 Claims. (Cl. 137—152)

1

This invention relates to safety valves and more particularly to safety shut-off valves for gas lines.

It is an object of this invention to provide an improved safety gas shut-off valve of the kind to be more specifically described hereinafter, which is so constructed and arranged that the gas or other fluid flow in a tube or line will be automatically shut off when the pressure through the valve drops to a predetermined value and will not go on again through the valve until reset by a person desiring to re-establish the gas or fluid flow.

The valve is designed primarily for use on gas lines which conduct gas to a burner so that when the flow of gas drops so far that the flame of the burner becomes extinguished the gas may not be started again without the knowledge of the person using the valve or burner whereby the gas is prevented from flowing and escaping from the burner and use for which it is intended.

Another object of this invention is to provide an improved safety cut-off valve of this kind which is very compact and may be readily installed in any fluid conducting pipe or tube by coupling the valve between adjacent pipe sections.

Still another object of this invention is to provide an improved safety cut-off valve having a minimum number of moving parts with which maintenance troubles may be found, which is simple and efficient in its construction and operation, and which may be readily installed in a fluid line without the use of special tools or without requiring special training and experience.

A further object of this invention is to provide an improved check valve of this kind having a valve slidably mounted in the body and a lever pivotally mounted in the body for operating the valve. The lever will be balanced at the opposite end from the valve by the pressure of the gas entering the valve body and will hold the valve open until the pressure decreases to such a point that the weight of the valve in the body will overbalance the lever for shutting off the flow.

With the above and other objects in view, our invention consists in the arrangement, combination and details of construction disclosed in the drawings and specification, and then more particularly pointed out in the appended claims.

In the drawings,

Figure 1 is a longitudinal section taken through a safety valve constructed according to an embodiment of this invention,

2

Figure 2 is a transverse section taken on the line 2—2 of Figure 1,

Figure 3 is a detailed fragmentary section taken on the line 3—3 of Figure 1,

Figure 4 is a longitudinal section of a modification of this invention,

Figure 5 is a transverse section taken on the line 5—5 of Figure 4.

Referring to the drawings, the numeral 10 designates generally a safety shut-off valve for use in gas lines or other fluid conveying tubes or pipes for shutting off of the flow of the gas or fluid through the pipes when the pressure drops to a predetermined minimum value. The safety shut-off valve of this invention is adapted to be formed in a cylinder or sleeve which may be a part of the tubes or pipes which normally convey the fluid or gas to a burner or other place where the fluid is used.

The safety shut-off valve 10 is formed with a tubular housing or body 11 which is threaded internally throughout its length as at 12, whereby the housing 11 may be joined with the threaded end of adjacent pipes 14. A cylindrical plug 15 is formed with exterior threads as 16 for engaging with the threads 12 of the sleeve 11 so that the plug 15 may be positioned entirely within the body 11. The plug 15 is formed with a notch 17 intermediate the length thereof, which extends substantially from one edge across the diameter of the block to provide a semi-circular elongated opening 18 therein. Cutting the notch 17 to form a space 18 in the plug 15 forms end walls 19 at the extremities of the plug. A passage or bore 20 is formed in the plug 15 extending longitudinally thereof and opening outwardly from one end, and the bore or passage 21 at right angles to the passage 20 communicates between the passage 20 and the space 18.

The upper end of the passage 21 is inclined outwardly to form a valve seat 22 at the bottom of the space 18. At the other end of the plug 15, a bore 24 is provided which extends longitudinally of the plug 15 parallel to the bore 20 and the bore 24 communicates between the open end of the plug 15 and the space 18. A ball 25 is positioned in the bore 24 for sliding or rolling movement therein and is prevented from rolling out of the bore 24 by a pin 26 through the end 19a of the plug 15, the pin 26 extending diametrically across the passage 24 for blocking the passage at the outer end.

For preventing the ball 25 from rolling into the space 18 of the valve, a short strip of metal 27 is fixed to the inner wall of the space 18 by a rivet 28 or other suitable fastening devices, and extends partly across the bore 24. A lever 29 is pivotally supported within the space 18 of the plug 15 intermediate its length, by a pin 30 between a pair of upstanding ears 31 fixed to the plug 15. One end of the lever 29 extends forwardly of the valve and is adapted to be positioned within the space 24. This end 32 of the lever 29 is inclined downwardly and forwardly at its extreme end, whereby the ball 25 may slidingly be engaged over the inclined edge for holding this end 32 of the lever down as the pressure or force of the fluid entering through the passage 24 holds the ball 25 against rolling or sliding down off of the lever 32. The other end 34 of the lever 29 in its normal position, as shown in full lines in Figure 1, extends forwardly and upwardly in the plug 15, and a valve 35 is loosely mounted on its extreme end. The extreme end of this end 34 of the lever 29 is provided with an opening 36 and a stem 37 of the valve 35 loosely engages in this opening 36 for loosely supporting the valve 35 thereon. The valve 35 is provided with a hemispherical boss 35' in which stem 37 is secured.

The extreme end of stem 37 is threaded to accommodate an interiorly threaded member or nut 38' for selectively positioning valve 35 relative to lever 34, and a threaded nut 38 serves as a lock nut. The valve 35 is engageable in the valve seat 22 when the pressure of incoming fluid is insufficient to hold the ball 25 on the lever 29 as the weight of the valve rocks the lever abouts its fulcrum. When the pressure is re-established in the pipes 14, it will be necessary to manually reset the valve 10. The incoming pressure will roll the ball 25 forwardly in the passage 24, but as the end 32 of the lever 29 is spaced upwardly from the bottom of the passage, the ball 25 cannot engage over this end.

In re-setting the valve 10, a plunger 39 is slidably mounted in the sleeve 11. The plunger 39 is formed with a cylindrical plug 40 threaded into the sleeve 11 or otherwise suitably attached, and a pin 41 is slidably supported in the plug 40. A disc or piston 42 is formed on the pin 41 within the plug 40, and a spring 44 between the bottom of the plug 40 and the piston 42 constantly presses the plunger 39 upwardly.

A cap 45 closes the upper end of the plug 40 for positioning the plunger 39 therein. The pin 41 engages the rear arm 32 of the lever 29 when pressed downwardly for moving the end of the lever adjacent the bottom of the passage 24 so that the pressure of the gas will roll the ball 25 on the lever 32 for holding the valve 35 open in its normal operative position.

In Figures 4 and 5 there is disclosed a modified form of this invention in which the ball 25 engaging on the lever 29 is omitted and replaced by a cup against which the force of the incoming fluid will impinge for holding the valve open. The valve 10a is disclosed in Figures 4 and 5 comprising a cylindrical sleeve 11a formed in the same manner as the sleeve 11, having a plug 15a positioned therein. The plug 15a is formed with a cutout portion 18a intermediate the length thereof, similar to the space 18 described above.

The plug 15a is formed with a longitudinal inlet passage 50 at one end thereof and an elbow 51 communicates with the passage 50 for turning the incoming fluid or gas at right angles downwardly in the space 18a. A lever 29a is pivotally mounted in the space 18a in the same manner as the lever 29, having a valve 35a rockably mounted at one end thereof in a manner generally similar to the connection of valve 35 on lever 29 except that boss 35b, formed as a round headed nut, is screw mounted on the stem 37b under the extended end 39a of lever 54. The stem 37b is formed with a dependent rod portion 37c which extends through a bore 137 in plug 15a and spaces valve 35a attached to the end thereof, a substantial distance from the lever end 39a. Threaded onto stem 37b above and 39a is an adjusting nut 138' and a lock nut 138 and a cup 52 fixed on the other end. The cup 52 is disposed immediately below the elbow 51 so that incoming gas through the inlet passage 50 and elbow 51 will impinge in the cup 52 for holding this end 54 of the lever 29a downwardly and the valve 35a open. The body 15a is formed with a cup-shaped opening 55 immediately below the cup 52 to provide a space for the cup in the downward position of this end 54 of the lever 29a.

A longitudinal passage 56 is formed in the plug 15a communicating with the space 55 by a right angular passage 57 and with a longitudinal outlet passage 58 through the valve seat 59 in the right angular passage 60 between the outlet 58 and the passage 56. Lugs 61 are provided at the bottom of the cup-shaped recess 55 to prevent the cup 52 from sealing the opening to the passage 57.

The incoming gas will pass through the passage 50 and the elbow 51 and impinge in the cup 52 for holding the end 54 of the lever downwardly and the other end 62 upwardly so that the valve 35a is raised from the valve seat 59 to permit the gas to flow about the cup 52 in the opening 55 through the passages 57 and 56, the valve 59, and out through the passages 60 and 58. When the pressure of the gas diminishes to a predetermined value, the weight of the valve 35a will overbalance the weight of the cup 52 and the end 62 of the lever 29a will move downwardly so that the valve 35a will seat in the valve seat 59 for closing the outlet passage through the plug 15a. For resetting the valve 10a, a plunger 39 is provided similar to the plunger 39 described above so that the pin 41 will engage the arm 54 of the lever 29a for raising the valve and opening the passage 60 when the pressure of the gas is re-established.

We do not mean to confine ourselves to the exact details of construction herein disclosed, but claim all variations falling within the purview of the appended claims.

What we claim is:

1. A safety valve comprising a tubular sleeve, a plug in said sleeve, said plug formed with an intermediate cutout portion, said plug formed with an inlet and outlet port at opposite ends thereof communicating with said cutout, a valve for closing said outlet port, a pivoted lever in said cutout portion connected at one end to said valve, the other end of said lever extended into said inlet port, said valve and one end of the lever overbalancing the other end of the lever, a ball in said inlet port engageable on said other end of said lever in said inlet port upon the flow of sufficient fluid through said inlet port, the weight of the ball and the other end of the lever being sufficient to overbalance the weight of the valve and said one end of the lever, said lever being so arranged that said ball is gravitatingly disengaged from said lever when the fluid flow falls to a predetermined value.

2. A safety shut-off valve comprising a tubular sleeve, a cylindrical plug in said sleeve, said plug formed with an elongated cut-out intermediate the length thereof, a lever pivotally mounted intermediate its length on said plug in said cut-out;

said plug formed with longitudinal bores through each end thereof communicating with said cut-out, a valve seat formed on the inner end of one of said bores, a valve rockably mounted on one end of said lever engageable in said valve seat, said valve and said lever producing a resultant moment of force about the pivot of said lever in a direction tending to seat said valve, and a fluid flow actuated member associated with the other end of said lever effective when subjected to a flow of fluid in excess of a predetermined value to apply to said lever a moment of force in a direction tending to unseat said valve sufficient to overcome the valve seating moment.

3. A safety shut-off valve comprising a tubular sleeve, a cylindrical plug in said sleeve, said plug formed with an elongated cut-out intermediate the length thereof, a lever pivotally mounted intermediate its length on said plug in said cut-out, said plug formed with longitudinal bores through each end thereof communicating with said cut-out, a valve seat formed on the inner end of one of said bores, a valve rockably mounted on one end of said lever engageable in said valve seat, said valve and said lever producing a resultant moment of force about the pivot of said lever in a direction tending to seat said valve, a fluid flow actuated member associated with the other end of said lever effective when subjected to a flow of fluid in excess of a predetermined value to apply to said lever a moment of force in a direction tending to unseat said valve sufficient to overcome the valve seating moment, and a spring-pressed pin slidable through said sleeve engageable with said other end of said lever for resetting said valve in valve open position, the moment of force of the weight of said valve and said lever exceeding the moment of force of said lever and said member to move said valve to valve closing position in the absence of said predetermined flow.

4. A safety cut-off valve comprising a cylindrical sleeve, a plug in said sleeve, said plug formed with a cutout portion intermediate the length thereof, a lever pivotally mounted intermediate its length in said cutout, said plug formed with an inlet and outlet port at opposite ends thereof, a valve for closing said outlet port, one end of said lever operatively connected to said valve, said valve and said lever producing a moment of force about the pivot of said lever in a direction tending to seat said valve, the other end of said lever extending into said inlet port, and a sliding member in said inlet port movable from a position out of engagement with said lever to a position engageable over with the other end of said lever by fluid entering said inlet port in excess of a predetermined velocity, said member when engageable over said lever coacting with said lever to provide a moment of force about said pivot sufficient to hold said valve open, and means for gravitatingly disengaging said member from said lever upon lowering of said velocity to a predetermined value, the said moment of force tending to seat the valve being sufficient to effect seating thereof when said sliding member is out of engagement with the lever.

5. A safety shut-off valve comprising a tubular sleeve, a plug in said sleeve, said plug formed with an elongated cut-out on one side intermediate the length thereof, said plug formed with an inlet and outlet port at opposite ends, and a communicating passage including said cut-out therebetween, a valve seat in said communicating passage, a lever pivotally mounted intermediate its length in said cut-out, a valve carried by said lever and arranged to cooperate with said seat, said valve and said lever producing a resultant moment of force about the pivot of said lever in a direction tending to seat said valve, a cup-shaped member on the other end of said lever positioned to be impacted by fluid entering the inlet and moved downwardly to open said valve when the weight of the cup and the force of the fluid produce a moment of force in excess of the moment of force of said valve and lever, the arrangement being such that when the velocity of entering fluid is above a predetermined amount, the valve will be opened, and when said velocity drops below a predetermined amount the valve will be closed.

PETER P. CATALANO.
JOSEPH P. CATALANO.
FRANK P. CATALANO.

REFERENCES CITED

The following references are of record in the file of this patent:

UNITED STATES PATENTS

| Number | Name | Date |
|---|---|---|
| 1,026,570 | Dressel | May 14, 1912 |
| 1,416,169 | Catalano | May 16, 1922 |